United States Patent [19]

Werth

[11] Patent Number: 5,510,201
[45] Date of Patent: Apr. 23, 1996

[54] METHOD OF OPERATING A FUEL CELL WHEREIN HYDROGEN IS GENERATED BY PROVIDING IRON IN SITU

[75] Inventor: John Werth, Princeton, N.J.

[73] Assignee: H Power Corporation, Belleville, N.J.

[21] Appl. No.: 281,901

[22] Filed: Sep. 23, 1994

Related U.S. Application Data

[63] Continuation of Ser. No. 52,561, Apr. 23, 1993, abandoned, which is a continuation-in-part of Ser. No. 874,113, Apr. 24, 1992, abandoned.

[51] Int. Cl.$^6$ ........................................ H01M 8/04
[52] U.S. Cl. .......................... 429/17; 429/13; 429/19; 429/20; 423/657; 423/658
[58] Field of Search ..................... 423/657, 658; 429/17, 19, 20, 13

[56] References Cited

U.S. PATENT DOCUMENTS

| | | | |
|---|---|---|---|
| 3,998,942 | 12/1976 | Pangborn et al. | 423/658 |
| 4,182,748 | 1/1980 | Anderson | 423/579 |
| 4,188,370 | 2/1980 | Fujii et al. | 423/579 |
| 4,310,503 | 1/1982 | Erickson | 423/657 |
| 4,547,356 | 10/1985 | Papineau | 423/658 |
| 4,826,741 | 5/1989 | Aldhart et al. | 429/19 |

*Primary Examiner*—M. Nuzzolillo
*Attorney, Agent, or Firm*—Salzman & Levy

[57] ABSTRACT

An improved system for generating hydrogen fuel for use in an energy-producing device such as a fuel cell or heat engine is disclosed. The hydrogen is produced at a faster rate by reacting particles of an activated iron reactant with heated water in a fluidized bed-type reactor. The reaction results in an increased rate of hydrogen production along with spent metal oxide particles which are easily and cheaply regenerable.

10 Claims, No Drawings

METHOD OF OPERATING A FUEL CELL WHEREIN HYDROGEN IS GENERATED BY PROVIDING IRON IN SITU

This is a continuation of application Ser. No. 08/052/561, filed on Apr. 23, 1993, now abandoned, which is a continuation-in-part of Ser. No. 07/874,113, filed on Apr. 24, 1992, now abandoned.

BACKGROUND OF THE INVENTION

There is a real need for the efficient production of hydrogen for use as a fuel in both vehicular and stationary engines and fuel cell systems. While hydrogen is a clean and efficient fuel for such energy producing systems, it is both expensive to produce in a pure form and unsafe to store in quantity (because of its combustibility). Moreover, hydrogen is expensive and heavy when stored in containers of practical size.

Fossil fuels or their derivatives, such as natural gas or methanol, are currently converted to hydrogen for use in a fuel cell by means of a complicated set of bulky components: a reformer (to convert the fossil fuel to a mixture of hydrogen, carbon dioxide, carbon monoxide and water vapor); a shift converter (to remove most but not all of the carbon monoxide); and one or more gas purifiers (needed if the hydrogen is to be used in a proton-exchange membrane fuel cell (PEM) or an alkaline fuel cell or stored as a metal hydride). The fuel cells that need no gas purifier, such as phosphoric acid fuel cells, are the heaviest and largest. A fuel cell that is relatively light-weight and compact, e.g. a PEM or alkaline fuel cell, generally needs complicated, delicate and expensive purifying apparatus to utilize hydrogen.

For cost and availability reasons, if the fuel is natural gas, then storage on vehicles such as fork lift trucks, automobiles, etc. is heavy, bulky, and of somewhat marginal safety. Gaseous hydrogen storage in such an environment is also a problem. It is either too voluminous (at low pressure) or too heavy (because of the tank or cylinder needed at high pressure). Moreover, both storage systems are potentially unsafe because of the combustibility of the hydrogen.

Storage of hydrogen as a metal hydride is also expensive since metal alloys suitable for hydrogen storage in readily reversible metal hydrides are expensive to fabricate and because they require the hydrogen to be free of carbon monoxide, carbon dioxide, and water vapor. Regeneration of such metal hydrides is also a problem because it requires pure hydrogen, which is relatively more costly than reformed natural gas, which is relatively inexpensive and contains impurities such as carbon dioxide and steam. Adding to the regeneration expense is the continuous supply of external cooling that is needed to drive the regeneration reaction. Recently it has been suggested that hydrogen be stored as $H_2SO_4$ and reacted with scrap iron to produce hydrogen. Dandapani et al., *Int. J. Hydrogen Energy*, 11 (2), 101–105, 1986. This approach, however, is extremely costly because of the cost and weight of sulfuric acid. The weight of the stored acid also restricts its use.

The reaction of iron with water (steam) to produce iron oxide and hydrogen is well known. However, the conversion rate of the reaction is extremely low unless the water has been heated to extremely high temperatures and this results in a low overall efficiency and thus it has no current practical commercial utility. One attempt at creating a hydrogen generating system based upon the reaction is disclosed in U.S. Pat. No. 4,547,356 (Papineau) which suggests that hydrogen may be generated by the catalytic decomposition of steam at temperatures of 1,000°–2,000° F. (540°–1,094° C.) to form hydrogen and supposedly oxygen. The patent contends that at those temperatures, the steam will disassociate in the presence of "a catalyst of a web-like cellular structure defined by interconnected metal filaments comprising iron, copper, silver, nickel, palladium, platinum, or iron-nickel and molybdenum" and that the hydrogen can then be separated from the oxygen with a diffusion-based separation membrane, e.g. palladium. Water or steam is thermodynamically incapable of decomposing into hydrogen and oxygen within the stated temperatures. The patent asserts that more hydrogen will be produced by the process than will be required for reactivating the catalyst when it has become deactivated because of use. As such, the patent teaches a perpetual motion machine.

However, due to the low cost of iron, the desire to develop a hydrogen generating system based on the iron-water reaction which system will generate hydrogen at a commercially viable high rate continues. The present invention arose from such a desire and has increased the rate of hydrogen generation of the system of U.S. Pat. No. 4,547,356 from an average of less than 0.2% per minute for the first hour at 450° C. (which dropped to 0.027% per minute for the second hour) to more than 2% per minute, thereby increasing the potential peak power by more than a factor of 10.

Accordingly, it is an object of the present to develop a process and system for more rapidly generating hydrogen in situ safely and at low cost.

It is another object of the present invention to develop an energy source which has a longer life than conventional storage batteries, need not be electrically recharged, and is an order of magnitude lighter in weight per unit energy produced.

It is a still further object of the present invention to develop a hydrogen generating system which is easy and relatively inexpensive to regenerate.

It is a still further object of the present invention to develop an energy source which is less delicate and less expensive than a metal hydride based hydrogen system.

SUMMARY OF THE INVENTION

Accordingly, the present invention is directed to a hydrogen generating system which rapidly produces hydrogen for use as a fuel in an energy producing device such as in a fuel cell or heat engine. The hydrogen is produced by the reaction of an activated particulate iron reactant and water. As defined herein "water" means liquid water, steam, or a mixture thereof. The present invention is also directed to a process for the production of such gaseous hydrogen.

The hydrogen generating system of the present invention comprises (i) a reaction zone which is a fluidized bed-type reactor (including tumbling drum and vibrating powder-type reactors) and which contains an activated iron reactant, (ii) a source of water at a temperature enabling it to react with the activated iron reactant in the reaction zone to form gaseous hydrogen and spent iron oxide, (iii) a means for controllably delivering the water to the reactor in response to demand from an energy producing device, and (iv) a means of providing heat necessary for starting and maintaining the reaction between the iron and the water, wherein the system is capable of converting iron to iron oxide at a rate of at least about 2%/minute at a temperature of less than about 450° C. Accordingly, as used herein, the term "activated iron reactant" refers to an iron material having the capacity of converting at least about 2% of the iron per minute into iron oxide at a temperature of about 840° F. (450° C.) or less.

The reaction which takes place in the reactor produces hydrogen and iron oxide. The system can be easily and inexpensively recharged by converting the iron oxide back to iron and replenishing the water. Although the reformation of the spent iron oxide could take place anywhere by use of relatively small reforming units, most commonly it will occur at centralized reforming facilities or at "fueling" stations. The hydrogen generating system of this invention will generally be associated with an energy producing device which will directly use the hydrogen produced as a source a fuel. Examples of such devices include fuel cells, including a PEM fuel cell, heat engines, a nickel-hydrogen battery, and electrical generators driven by heat engines.

The advantages of the present invention over previous attempts to use the iron-water chemical reaction to generate hydrogen include substantially increased rate of hydrogen formation which reduces the weight and volume of iron reactant needed to obtain a specific amount of hydrogen within a specific time. For example, the minimum amount of iron reactant needed to generate sufficient hydrogen for operating a 50 kW fuel cell suitable for use in powering a bus for one hour in which the operating voltage is assumed to be about 0.65 V will depend upon the conversion rate as follows:

| Fe Conversion Rate %/min | Weight of Iron, lb |
|---|---|
| 14 | 16.5 |
| 7 | 33 |
| 4 | 58 |
| 2 | 116 |
| 1 | 232 |
| 0.2 | 1,160 |
| 0.027 | 8,590 |

Since increasing the conversion rate of the reaction reduces the amount of activated iron reactant which must be heated to operating temperature before operation can begin, both the start-up time and the operating costs are drastically reduced by successfully increasing the conversion rate. Heating 1,150 pounds of iron to 1,000° F. (540° C.) as in U.S. Pat. No. 4,547,356 with its maximum conversion rate of about 0.2%/min in the first hour will take many times the energy and the number of minutes that will be needed to heat 116 pounds of iron to 800° F. (425° C.) or less at a conversion rate of 2%/min. When the hydrogen generating system is repeatedly turned on and off, as when powering an automobile, the energy needed to heat the iron for every short trip will be wasted. The above amounts of iron are calculated on to provide sufficient hydrogen for one hour of operation and to determine the total weight actually required for a specific system will need to be multiplied by the number of hours of use required between "refuelings."

The advantages of the invention over metal hydride storage or gaseous hydrogen storage include lower cost, greater simplicity, and less weight and volume. Also as compared to any gaseous hydrogen storage system there is much greater safety.

DETAILED DESCRIPTION OF THE PREFERRED EMBODIMENTS

More specifically, the hydrogen generating system of the present invention comprises a reactor containing an activated iron reactant and a separate container containing water, generally for conversion into heated water or steam. In addition, the system contains a means for controllably delivering the water to the reactor in response to a demand from an energy producing device and means for providing heat necessary for starting-up and maintaining the reaction between the heated water and the activated iron reactant. Although generally the water will be heated to form steam, when a sufficiently active activated iron reactant is used or when a low flow of hydrogen is required, this may not be necessary.

The reactor according to the present invention generally comprises one or more generally tubular fluidized beds or tumbling (rotating) drums or vibrating powder beds filled with the activated iron reactant. The beds/drums are preferably made from materials that conduct heat, although in certain embodiments of the present invention in which heat is generated internally such as by $O_2$ injection, heat conductive materials are not necessary. Preferably, the beds/drums are made from materials such as stainless steel, high temperature plastics, pyrex, or ceramics. The size of the beds/drums will depend upon the size of the generating system. However, they generally have an inside diameter of from about ¼" (0.635 cm) to 2 ft (61 cm) and a length of from about 6" (15 cm) to 20 ft (6.1 m). The number of tubes will also vary depending upon the size of the system. Generally there will be from about 1 to 100 tubes, preferably from about 1 to 5. The tubes may be of varying sizes, shapes, and may be located at varying angles to the horizon.

The activated iron reactant in the reactor tubes is an iron material having sufficient activity and available surface area so as to be capable of converting at least about 2% of the iron per minute into iron oxide at a temperature of about 840° F. (450° C.) or less. In fact, depending upon the activity of the iron reactant, the system can be capable of converting at least about 4% of the iron per minute into iron oxide at a temperature of less than about 300° C. and about 2%/minute at 200° C. In fact, iron conversion rates over 14%/minute have been obtained from specific activated iron reactants at a temperature of about 450° C. with a large excess of steam.

Generally suitable activated iron reactants will possess the following general properties: (1) a weight average particle size of from about 0.1 to about 1,500 μm, preferably from about 25 to about 1,200 μm; (2) a particle size distribution in which at least about 20% of the particles are less than about 300 μm in diameter, preferably at least about 50%; (3) a particle density of from about 1 to 7.8 g/cc; (4) a non-compressed packed particle density of about 1 to about 5 g/cc, preferably from about 1 to about 3 g/cc; and (5) a surface area of greater than about 0.0001 meters$^2$/g, preferably greater than about 0.001 meters$^2$/g. Preferably, the iron reactant will be produced from an iron ore which contains at least about 0.05 wt % vanadium. Also preferably the iron reactant will be produced by the reduction of iron ore to Fe at a temperature of about 650° to 1,000° C. Also preferably, the iron reactant will be capable of spontaneous ignition in the presence of air and moisture given sufficient bulk and time to heat up.

The activated iron reactant is generally formed starting with the reduction of iron oxide ore pellets at an elevated temperature, e.g. about 650° to 1,000° C. The lower temperatures in this range are preferred for increasing the activity of the resulting iron reactant while the higher temperatures are preferred for providing greater fuel efficiency to the reduction process. The specific temperature of reduction to produce the activated iron reactant will depend upon an economic balance between these considerations. The activated iron reactant may be prepared by crushing larger, i.e. about 0.125 to 0.75" (3.2 to 19.1 mm) diameter, pellets of the iron reactant into small particles. Alternatively, the fines produced during the manufacture of such pellets may be used directly. A particularly suitable starting iron is direct reduced iron ("sponge iron") because it is easily crushed into suitable size particles. Direct reduced iron has been reported as showing a tendency to spontaneously combust in an oxygen and moisture-containing atmosphere in a manner similar to that of coal.

The iron reactant particles may be stored, handled, and transported under an inert gas such as carbon dioxide, nitrogen, or a mixture thereof to prevent air or moisture oxidation of the particles. An alternative inert gas may be the flue gas residue from a reformer burner after the water vapor component of the flue gas has been extracted by means such as condensation. The water would normally be extracted from the flue gas to make water for the reformer and/or for the oxidizing reactor, leaving a flue gas residue of nitrogen and carbon dioxide. A slight positive presure (about 1–2" $H_2O$) (2–4 mm Hg) should be maintained at all times that a reactor bed contains unreacted iron reactant particles. When the reactor bed is reacting with steam, the steam will provide the over-pressure. When a reactor bed is used non-continuously and allowed to cool between uses after an active period and the pressure falls, an inert gas such as carbon dioxide should be supplied to maintain a pressure of more than 1 atm. This procedure prevents air from infiltrating the inside of the reaction chamber while active unreacted iron particles are present.

An alternative to the inert gas use to protect the iron reactant particles during storage, handling, and transportation is to crush the larger reduced iron pellets into the reactant particles substantially immediately prior to use, i.e. in situ. In this case, two (or more) small reactors can operate substantially sequentially without on-site regeneration of spent iron oxide. The two reactors are loaded with fresh reactant particles only sequentially as needed to produce hydrogen for a specific purpose, rather than en masse. So doing will help minimize the amount of reactant particles which will need to be raised to operating temperature, thereby reducing start-up time and energy requirements. This alternative can be accomplished by placing atop the reactor beds a crushing device which will receive larger iron pellets, crush them, and deliver the particulate material to a reactor bed, preferably by gravity and preferably while providing a slight positive pressure of an inert gas such as carbon dioxide during both the crushing and delivery. When the first such reactor bed is filled with particles, the delivery chute is sealed off, and a slight positive pressure of the inert gas is maintained in the reactor bed until water is introduced for hydrogen production. When the first bed approaches exhaustion by conversion of the iron to $Fe_3O_4$, a second bed is then loaded with freshly crushed particles, a slight positive pressure maintained, and then hydrogen production commences. When the first reactor bed is exhausted, the water feed to the reactor is halted and the iron oxide particles removed, preferably by means of gravity, into a container for waste particles. When the second bed approaches exhaustion, the first bed is then reloaded with freshly crushed particles under a slight positive pressure until hydrogen production by the bed re-commences. The process then repeats itself as needed until the stored iron pellets are depleted.

To detect the exhaustion of the hydrogen generating capacity of one of the reactor beds, the partial pressure drop of hydrogen produced or the partial pressure rise of the steam at the outlet end could be detected by conventional sensors. However, sensing partial pressure changes may not give adequate time to fully prepare the second reactor bed (including bringing it to operating temperature) and thus measurement of any of the following can provide additional time: metering the water fed into the reactor bed, determining reactor weight gain which will be directly proportional to the conversion of iron to iron oxide by the oxidation reaction, electrically measuring the coulombs (ampere-hours) coming out of the fuel cell, or measuring the flow of hydrogen produced by an integrating flow meter.

This dual bed technique avoids problems of handling and shipping fine iron particles under a continuous cover of an inert gas and permits the use of two small beds to accomplish the hydrogen generation of much larger non-refillable beds. The energy required for operating the crusher on an automobile can be provided by clutching the crusher to the vehicle's drive shaft train whenever fresh particles are needed and the brake pedal is depressed.

The system further contains a means for controllably delivering the water to the reactor in response to a demand from an energy producing device. The demand for hydrogen in many applications will vary from nearly zero to a rate corresponding to the maximum conversion rate of the iron. Control of the hydrogen output rate is provided by controlling the rate at which the water is fed into the reactor, e.g. it is fed proportionately (or stoichiometrically). One such method of so doing is to simply meter the liquid water which is supplied to the iron reactant either directly or after injection into a boiler which is used to heat the water to a suitable temperature or to convert it to steam, depending upon the reaction temperature to be used. In both cases, the more water that is supplied, the more hydrogen that is produced, up to the maximum based upon the activity of the specific iron reactant utilized.

An alternative control technique will be to intentionally maintain a slight positive hydrogen pressure at a specific spot between the iron-water reactor and the hydrogen-consuming device. For example, a pressure transducer can monitor a slight positive hydrogen pressure and tell a water metering/dispensing device to feed more water if the $H_2$ pressure is low, and vice-versa. The typical $H_2$ pressure for a fuel cell might be a few inches of water, unless it's a pressurized fuel cell, in which case it could be as high as maybe 5 atmospheres. When the demand for hydrogen increases, more $H_2$ will get drawn from the iron bed, the $H_2$ pressure will drop, the water injection rate will increase, more hydrogen will be generated, and the $H_2$ pressure will be restored to its designed steady state amount. This type of pressure control system tailors the pressure to the load so that at a high load a higher steady-state pressure can be provided than would be present at low load.

As a further alternative, the control system performance could be made smoother and more stable by taking a measure of the load (such as the fuel cell output current or the engine shaft horsepower) as the first order control for the metering device or metering valve. The hydrogen pressure signal then would act as a second order control (a vernier, so to speak) to correct imbalances between the demand and the supply.

During the reaction, the water in the container is generally heated to form, in most cases, steam. Some of the water can be provided by condensing out water vapor either in the hydrogen produced hereby prior to use or in the exit stream from the energy producing device. The steam flows into and reacts with the iron metal reactant to produce an iron oxide, such as $Fe_3O_4$, and hydrogen gas. With a fluidized bed reactor, the flow of steam will lift and suspend the particles. To initiate the reaction, start-up heat is needed to create steam from the water. This heat may be provided by a variety of suitable means, such as by injecting heated water and air into a reactor zone to rapidly oxidize the iron reactant. Hydrogen will generally not be produced by the reaction with the air present, but heat will be and the heat produced is greater and the heat-up potentially faster than when the iron reacts with steam alone to form hydrogen. Additionally, a catalytic or ordinary burning of the hydrogen produced by the injected water and air may be used to help heat the iron reactant up to the temperature needed to initiate reaction. A further source of the start-up heat is the burning of a conventional fuel such as compressed natural gas, propane, or gasoline in a separate burner, employing a suitable means to transport the heat generated. A further potential source of start-up heat is a storage battery disposed within or adjacent to the energy producing device.

A more complex scheme for supplying start-up heat to the reactor zone is to employ a plurality of reactor beds in the reaction zone with either one smaller reactor bed or a series of beds of graduated sizes. First, the smallest bed is brought up to operating temperature with a battery or a small burner. Then the hydrogen it produces is burned with air to form water and to heat up the larger reactor beds. In the case of graduated sized beds, the hydrogen produced by the next larger bed may be used to heat up the next even larger bed.

The vaporization of the water of reaction into steam may be achieved by any conventional heating means. For example, heat may be supplied by transferring waste heat from an energy producing device, e.g. the fuel cell or heat engine, to which the hydrogen generator of this invention is associated, to the water to vaporize it. In the case of a PEM fuel cell, the waste heat is generally at about 90° C., a temperature which may be too low for a hydrogen generating system running at ambient atmospheric pressure, but this can be overcome by mixing the subatmospheric steam produced at circa 90° C. with some of the hydrogen produced by the energy-producing system on discharge. Together, the two gases will have a total pressure of one atmosphere absolute, allowing the vaporization of the water to proceed at a partial water vapor pressure of less than one atmosphere.

If the discharge rate of the fuel cell or engine is so low that the reactor beds tend to cool down or an endotherm is needed to adequately maintain the reaction, a variable and controlled amount of air or oxygen may be injected into the iron reactant bed during the discharge reaction with steam. This will allow maintenance of a higher reaction temperature.

While the temperature of the reaction may be any temperature generally above about 0° C., generally the reaction temperature will be within the range of about 100° to 450° C. to provide a balance between the hydrogen generation rate and the efficiency of utilizing the heated water. For thermodynamic reasons, iron metal oxidation by steam is more efficient at low temperatures:

| Temperature °C. | % Steam Wasted |
|---|---|
| 200 | 2 |
| 300 | 5 |
| 400 | 11 |
| 800 | 40 | while iron oxide reduction back to iron is more efficient at high temperatures. Therefore and in view of the excessive weight and complexity of an on-board reformer, such a reduction system is not considered desirable for automotive-type uses. When oxidation temperatures greater than about 300° C. are used, complications in terms of materials, thermal insulation, and initial heat-up time can occur, making those temperatures somewhat less suitable for use on a vehicle. In such cases it may be advantageous to add a catalyst to lower the hydrogen overpotential of the iron reactant in the presence of water or steam to more moderate temperatures, e.g. about 50° to 150° C. The lower hydrogen overpotential means that the kinetics of the reaction will be improved, thus allowing the reaction to take place at a lower temperature and lessening strains on the system. Suitable catalysts for use to improve reaction kinetics are likely to include noble metals such as platinum and palladium as well as base metals such as antimony.

When used, a catalyst may be added to the system by mixing it as a powder with the particulate activated iron reactant. Alternatively, the catalyst may be galvanically linked to the iron reactant via an electrolyte dissolved in the water of reaction and an electrical contact between a catalyzed sheet or basket and the iron reactant. Suitable electrolytes include aqueous solutions of ferrous sulfate, ferric sulfate, sodium sulfate, potassium sulfate. Sodium sulfate is presently preferred because it is neutral and does not react with either Fe or $Fe_3O_4$. With enough catalyst and good catalyst geometry, temperatures as low as 0° C. may be all that are needed to initiate and maintain the reaction. In such cases the water would be simply transferred to the reaction zone by suitable means such as pumping and gravity feed. Because of relatively high catalyst costs as compared to activated iron reactant costs, the lowering of the temperature as far as possible may not be economically the most sensible design. The cost of the catalyst must be balanced with the reaction kinetics. Generally, a system sufficient to provide an operating temperature of from about 80° C. to about 300° C. will be preferred.

In order to avoid the cost of alloying or mixing a catalyst with the iron reactant, certain catalysts may be added directly to the water of reaction as soluble metal compounds. Examples of such soluble metal compounds are noble metal compounds such as platinic acid or any chloroplatinate. The catalyst is added to the water of reaction as a soluble compound such as potassium chloroplatinate. The interaction between the iron reactant with the water of reaction and with the soluble compound causes the iron reactant to be catalyzed for faster reaction with water when forming hydrogen and iron oxide. It is believed that this technique may enable the metal catalyst to come into permanent contact with the iron reactant, lowering its hydrogen overpotential and accelerating the generation of hydrogen at relatively low temperatures such as about 25° C. to about 100° C.

One of the advantages of the present invention, over other hydrogen production systems including certain metal hydride based systems, is its the ability to regenerate or reform the spent iron oxide after the completion of the reaction and production of hydrogen. This advantage is even more pronounced because of the relatively low cost involved in the regeneration of the spent iron oxide. The system of the present invention may employ a variety of methods to regenerate the spent iron oxide.

One method of regeneration comprises reacting the iron oxide with a reducing gas or mixture of gases or a liquid. The presently preferred reducing agent because of its relatively low cost is reformed natural gas. This gas generally comprises a mixture of hydrogen, carbon monoxide, carbon dioxide, and residual steam. While hydrogen and carbon monoxide are the only active reducing agents, the iron/iron oxide bed being regenerated is not damaged by the presence of the other two components. If hydrogen gas is available at a lower cost than reformed natural gas, it could be used, provided that heat is added to the reaction which is somewhat endothermic. Relatively pure carbon monoxide, where available, can also be used as a reducing agent. It, however, would contribute about four to five times more carbon dioxide to the greenhouse effect than reformed natural gas and it is more exothermic than needed to sustain the reaction, thus it is less efficient. The gaseous reducing agents may be supplied as a reformed liquid fuel such as reformed methanol, reformed ethanol, reformed petroleum derivatives, and reformed or decomposed ammonia.

The reformed fuels may be derived by various techniques including: via steam-reforming (wherein the fuel in gaseous form is reacted with steam); via partial oxidation (wherein the fuel is reacted with oxygen or air in proportions less than that needed for complete oxidation); or via autothermal reforming (wherein the fuel is partially reacted with steam and partially with oxygen or air). Steam reforming is more efficient than partial oxidation in terms of yield of hydrogen per unit of fuel. While steam reforming is endothermic (requires externally supplied heat to sustain itself) and while partial oxidation is exothermic (yields heat), autothermal reforming is intermediate between steam reforming and partial oxidation with regard to both hydrogen yield and heat addition/removal. The selection of a particular reforming process will thus be made based upon factors which include hydrogen yield required, equipment costs and complexity, overall process heat requirements, and the like for the particular operation.

Since the reduction reaction of iron oxide by hydrogen to form iron is generally endothermic, taking place at about 700° to 1,100° C., heat must be supplied. One method is to inject air or oxygen into a reactor bed, so that some of the reducing agent burns and thereby heats up the regeneration reaction zone, i.e. autothermal reforming. Another method is to burn the vent gas from the hydrogen producing reaction and transfer its heat of combustion to the regeneration reaction zone through the walls of the reactor. Still another method is to burn part of the reducing agent upstream of the reforming device and transfer the heat of combustion across the reactor bed walls of the iron/iron oxide containing reactor. Another approach is to make the reaction of the reducing agent and the iron oxide exothermic. This can be accomplished by maintaining enough carbon monoxide in the reducing gas mixture to make the sum of the reduction reactions slightly exothermic.

Still another scheme for supplying the necessary heat to maintain the regenerating reaction is to burn vent gas from another near-by regenerating bed. This vent gas normally contains a mixture of unused hydrogen, steam, carbon monoxide, carbon dioxide, and unreacted reformate. Some of the unreacted reducing mixture can be utilized in a reformer burner to compensate for the endothermic nature of the steam reforming reaction and that of the reducing process if hydrogen prevails in the reformate. The rest is truly wasted. To minimize this, two separate reduction stages in series, each preceded by a water-removing condenser, may be used. The condenser upstream of the first reducing stage removes water from the reformate and the condenser upstream of the second reducing stage removes water from the first stage exhaust. With less water coming into a subsequent reducing stage, less unused hydrogen will come out in the end. Thus water is condensed out of the vent gas and a drier resulting mixture is then fed to the next stage of the iron oxide-to-iron regenerator. The vent gas of the second stage can then be burned to provide the needed endotherms and the overall efficiency would be better than that of a single stage regenerator. Alternatively, only one condensing stage may be used but at a lower efficiency.

For a vehicle-mounted system, the reformation process will preferably be performed at a location away from the energy producing device, including at central plants which receive spent material from numerous sources. Generally, the spent iron oxide particles will be pelletized to form relatively large, i.e. about 0.125 to 0.75" (3.2 to 19.1 mm), diameter pellets of the iron oxide and then reducing the pellets to iron metal. Thereafter, the pellets will be crushed into the appropriate size activated iron reactant particles for re-use. The iron and iron oxides may be transferred to and from refueling stations both near and distant from the site of the energy producing device. The recycling of the metal reactant can theoretically occur an infinite number of times in view of the use of the particulate iron reactant, although some crushing or grinding of agglomerated materials may be beneficial between cycles, even if the iron oxide particles are not pelletized prior to regeneration.

An alternative to using a relatively large and removed central processing facility for reforming the spent metal oxide is to use smaller reformer units at the site of the energy producing device, e.g. at a refueling station. As with the centralized reforming unit, the on-site reforming units may be used to convert the spent iron oxide to iron reactant as described previously using, for example, reformed natural gas. The reduced iron may then be reused to generate hydrogen immediately or stored for such use at a later time.

As an alternative to directly using the iron-water reaction to produce hydrogen which is directly used as a fuel for such as a fuel cell or engine, the hydrogen may be stored in a metal hydride storage bed. Since the hydrogen produced in accordance with this procedure is slightly wet, the hydrogen will need to be dried, such as by passing it through a desiccant. Then the dried hydrogen can be conveyed to and absorbed in a metal hydride bed (or some other storage device) for later use. To store the hydrogen as a metal hydride, it is directly reacted with a metal or metal alloy such as iron-titanium, nickel-lanthanum, or nickel-calcium. Pressure may have to be applied and heat may have to be removed from the metal hydride bed to sustain the exothermic reaction at a desirably low reaction pressure. The heat can be removed, for example, (i) by recirculating part of the hydrogen that enters the metal hydride bed and cooling it before it mixes with fresh hydrogen from the metal-steam bed or (ii) by using a separate heat transfer medium, such as a liquid or gaseous coolant, to keep the metal hydride container and its contents adequately cool. The metal hydride thus formed becomes a direct source of hydrogen which may be used for powering a fuel cell or engine with the iron reactant-water reaction of the invention being an indirect source of said hydrogen. This procedure may be particularly applicable during the start-up or heat-up period.

An alternative means for providing additional hydrogen during start-up or heat-up is to simply provide a small amount of stored hydrogen at ambient or near-ambient pressure in a storage device. Once the energy using device is at temperature and fully operative, some fresh hydrogen can be diverted by means of a solenoid valve controlled by a pressure sensor or pressure switch from its principal load to replenish the storage device, be it pressurized or not. In this case, the hydrogen storage device acts like the storage battery in an automobile, supplying energy during start-up and absorbing it during normal driving for later use.

The system is associated with an energy producing device which uses the hydrogen produced from the reaction between the water and activated iron reactant as a fuel. The reactor and water container may either be located outside of the energy producing device or self-contained therein, depending upon the particular device and end-use thereof. Such energy producing devices include fuel cells, such as PEM fuel cells, and heat engines, such as internal or external combustion engines. The heat engine may be a free standing engine or one that mechanically drives an electrical generator or alternator.

The hydrogen generating system produces wet, slightly wet, or nearly dry hydrogen, depending upon the temperature of the iron oxidation reaction and the presence or absence of a water condenser to remove water from the output hydrogen stream. When this hydrogen is used to fuel a heat engine, the exhaust from the engine will contain neither carbon monoxide nor hydrocarbons. The exhaust can also be freed of $NO_x$ either by injecting more hydrogen than is needed to react stoichiometrically with the injected air (a rich combustion mix) or by injecting hydrogen into the engine exhaust stream at a temperature equal to or lower than the initial exhaust temperature or by some combination of the two. The first scheme suppresses $NO_x$ by reacting it with hydrogen before it can build to an appreciable concentration in the engine or exhaust manifold while the second burns the secondary hydrogen using any $NO_x$ present in the exhaust as the oxidant.

For automotive use in particular, especially in urban or slow suburban traffic, a combination of two hydrogen fueled vehicle drive systems may be advantageous. The first would be an electric motor powered by a hydrogen fuel cell and the second would be a hydrogen fueled engine. The dual combination will use less fuel than a hydrogen engine operating alone and could cost less than a fuel cell-based drive sized to generate the average vehicle power by itself. A hybrid scheme of fuel cell and engine, possibly using a third component (such as a battery, a flywheel or an ultracapacitor) for surges, is especially suited for the hydrogen generator system since it can supply hydrogen for both drives. The hybrid scheme will have the potential of producing zero exhaust pollutants and zero tank emissions. At idle and in slow or downhill traffic when the motive power input required is low or even negative, the hydrogen combustion engine can be shut off allowing the fuel cell-powered electric motor to alone propel the vehicle. On down-slopes, the engine could free-wheel without a fuel input so that at the bottom of the hill it could immediately start generating traction without first having to rev up to driving speed. There will be a substantial fuel savings from so doing because a combustion engine uses much more fuel at part load and idle than does a fuel cell. As power demands increase, the engine can turn on and be automatically clutched to the car's transmission and final drive so that both the engine and the electric motor propel the vehicle. This hybrid system will enable the fuel cell, with its high capital cost per unit power, to be sized to a fraction of the average vehicle power demand, yet allow shut-off of the engine at low power or idle when it would consume far more fuel than a fuel cell.

When a reduced iron is to be immediately used as a fuel source in a hydrogen powered on-site device, a suitable system may entail a cyclic operation of at least two iron/iron oxide beds. In such a system, the net effect will be entrance of a selected fuel into a reforming process and output of moist hydrogen. The fuel to the reforming process can be virtually any hydrocarbon species or mixtures thereof including an alcohol. A particular advantage of the present process is the lack of any need for upgrading or purifying the resulting reformate gas. The resulting reformate reduces the iron oxide to the metallic state. Simultaneously in a second iron/iron oxide bed which is then in the metallic state, the iron is reacted with steam to produce moist hydrogen. The moist hydrogen is delivered to a fuel cell or other hydrogen powered device. The dual bed reductive regeneration/hydrogen generation system can be highly integrated with the reformer from a thermal standpoint to maximize the energy efficiency of the overall process. The process can then continue indefinitely with the dual beds being cycled at suitable frequencies through the use of solenoid valves or the like. The dual bed system is particularly suitable for proton-exchange membrane and alkaline fuel cells which operate efficiently and at very high power densities on moist hydrogen fuel.

During regeneration of the spent iron oxide, the reformed natural gas may contain sulfur impurities, which may accumulate in the bed over many regeneration cycles. The sulfur will react with the iron reactant creating iron sulfides. The iron sulfides might not be decomposed either by steam on discharge or by fuel or reformate in recharge. This will eventually tie up irreversibly a large fraction of the iron reactant bed as iron sulfides instead, preventing it from switching from iron oxide to elemental iron. In order to overcome this contamination problem, unwanted iron sulfide FeS can be converted to sulfur dioxide ($SO_2$) or ferrous sulfate ($FeSO_4$) and some iron oxide by briefly, e.g. 1–15 minutes, passing a stream of air over the heated bed of spent iron oxide before that bed is reduced to elemental iron. Any accumulation of $FeSO_4$ can be removed by washing the particles with water to dissolve it prior to regeneration. Since the bed must be heated to regenerate it, little or no additional heating is needed to remove the iron sulfide by hot air oxidation. The transition from air to reformate or fuel through the bed can be made safe against explosion by briefly purging the bed with carbon dioxide, steam, nitrogen, or any other suitable inert gas. In particular, a mixture of steam and $CO_2$ from another bed being regenerated is a readily available, essentially cost-free purging agent.

What is claimed is:

1. A method of operating a hydrogen-air fuel cell that is fed by the in situ generation of hydrogen, which hydrogen is generated by passing $H_2O$ into contact with ground or crushed iron, said iron being ground or crushed in situ to enhance its activity and used in a reaction with said $H_2O$ within an operative cycle after grinding or crushing, said method comprising the steps of:

(a) providing a fluidized bed of iron, said iron being initially in a pellet form prior to grinding or crushing in order to supply iron particles for said fluidized bed, and a source of $H_2O$ in combination with a hydrogen-air fuel cell;

(b) generating hydrogen for said hydrogen-air fuel cell by reacting said iron with said $H_2O$ at an approximate maximum temperature of about 450° C.;

(c) grinding or crushing said iron to produce active iron particles, whose reactivity is enhanced to generate hydrogen in step (b) at a rate of approximately at least two percent per minute (2%/min.) at said approximate maximum temperature of about 450° C., said grinding or crushing being accomplished in situ within an operative cycle of said hydrogen-air fuel cell;

(d) supplying said hydrogen generated in step (b) to said hydrogen-air fuel cell;

(e) generating $H_2O$ and electricity in said hydrogen-air fuel cell; and (f) using at least some of the H₂O generated in step (e) to resupply H₂O for the generation of hydrogen in step (b).

2. The method in accordance with claim 1, further comprising the step of:

(g) grinding or crushing said iron in pellet form in accordance with the grinding or crushing step (c) to provide particles of iron in a particle size having a range from approximately 0.1 to 1,500 µm.

3. The method in accordance with claim 1, further comprising the step of:

(g) supplying heat to the reaction between the H₂O and the iron in step (b) for starting the reaction between the H₂O and said iron.

4. The method in accordance with claim 2, further comprising the step of:

(h) grinding or crushing said iron in pellet form in accordance with the grinding or crushing step (c) to provide iron in a particle size having a particle size distribution range in which at least twenty percent (20%) of the particles are less than approximately 300 µm in diameter.

5. The method in accordance with claim 2, further comprising the step of:

(h) providing particles of iron in accordance with the grinding or crushing step (c) having a non-compressed particle density in an approximate range of from one to five grams/cc.

6. A method of operating a hydrogen-air fuel cell that is fed by the in situ generation of hydrogen, which hydrogen is generated by passing H₂O into contact with ground or crushed iron, said iron being ground or crushed in situ to enhance its activity and used in a reaction with said H₂O within an operative cycle after grinding or crushing, said method comprising the steps of:

(a) providing iron as a fluidized bed of iron particles, and a source of H₂O in combination with a hydrogen-air fuel cell;

(b) generating hydrogen for said hydrogen-air fuel cell by reacting said iron with said H₂O at an approximate maximum temperature of about 450° C.;

(c) grinding or crushing said iron to produce active iron particles, whose reactivity is enhanced to generate hydrogen in step (b) at a rate of approximately at least two percent per minute (2%/min.) at said approximate maximum temperature of about 450° C., said grinding or crushing being accomplished in situ within an operative cycle of said hydrogen-air fuel cell;

(d) supplying said hydrogen generated in step (b) to said hydrogen-air fuel cell;

(e) generating H₂O and electricity in said hydrogen-air fuel cell; and (f) using at least some of the H₂O generated in step (e) to resupply H₂O for the generation of hydrogen in step (b).

7. The method in accordance with claim 6, further comprising the step of:

(g) grinding or crushing said iron in accordance with the grinding or crushing step (c) to provide particles of iron in a particle size having a range from approximately 0.1 to 1,500 µm.

8. The method in accordance with claim 6, further comprising the step of:

(g) supplying heat to the reaction between the H₂O and the iron in step (b) for starting the reaction between the H₂O and said iron.

9. The method in accordance with claim 7, further comprising the step of:

(h) grinding or crushing said iron in accordance with the grinding or crushing step (c) to provide iron in a particle size having a particle size distribution range in which at least twenty percent (20%) of the particles are less than approximately 300 µm in diameter.

10. The method in accordance with claim 7, further comprising the step of:

(h) providing particles of iron in accordance with the grinding or crushing step (c) having a non-compressed particle density in an approximate range of from one to five grams/cc.

* * * * *